United States Patent
Liu et al.

(10) Patent No.: US 12,311,574 B2
(45) Date of Patent: May 27, 2025

(54) METHOD AND SYSTEM FOR MOLDED COATING ON CMC

(71) Applicant: Raytheon Technologies Corporation, Farmington, CT (US)

(72) Inventors: Xuan Liu, Glastonbury, CT (US); James T. Beals, West Hartford, CT (US); Xia Tang, West Hartford, CT (US); Justin R. Hawkes, Marlborough, CT (US); Olivier H. Sudre, Glastonbury, CT (US); William F. Werkheiser, East Hartford, CT (US); Brian T. Hazel, Avon, CT (US); Richard Wesley Jackson, Mystic, CT (US)

(73) Assignee: RTX CORPORATION, Farmington, CT (US)

( * ) Notice: Subject to any disclaimer, the term of this patent is extended or adjusted under 35 U.S.C. 154(b) by 437 days.

(21) Appl. No.: 17/401,721

(22) Filed: Aug. 13, 2021

(65) Prior Publication Data
US 2022/0297345 A1    Sep. 22, 2022

Related U.S. Application Data

(60) Provisional application No. 63/065,665, filed on Aug. 14, 2020.

(51) Int. Cl.
*B28B 23/00* (2006.01)
*B28B 1/24* (2006.01)
(Continued)

(52) U.S. Cl.
CPC ............ *B28B 23/0056* (2013.01); *B28B 1/24* (2013.01); *B28B 7/0008* (2013.01); *B28B 7/06* (2013.01);
(Continued)

(58) Field of Classification Search
CPC ......... B28B 23/0056; B28B 1/24; B28B 7/06; B28B 7/348; B28B 1/30; B28B 19/00;
(Continued)

(56) References Cited

U.S. PATENT DOCUMENTS 4,356,230 A * 10/1982 Emanuel ............. B29C 37/0032
264/269
10,392,312 B2   8/2019 Tang et al.
(Continued)

FOREIGN PATENT DOCUMENTS

EP     1088908     4/2001
EP     3135866     3/2017
(Continued)

OTHER PUBLICATIONS

Machine English translation of Oyama Tetsuo (JPH0872097A) (Year: 1996).*
(Continued)

*Primary Examiner* — Jeffrey M Wollschlager
*Assistant Examiner* — Edgaredmanuel Troche
(74) *Attorney, Agent, or Firm* — Carlson, Gaskey & Olds, P.C.

(57) ABSTRACT

A method of forming a coating includes providing a mold that has a flexible wall that defines a mold cavity, inserting a component that is to be coated into the mold cavity, the component having a component surface roughness and there being a coating gap defined between the component and the flexible wall of the mold cavity, introducing a molding slurry into the mold cavity, the molding slurry filling the coating gap and contacting the component so as to overcoat the component surface roughness, solidifying the molding slurry to form a green coating on the component, and consolidating the green coating to form a final coating on the
(Continued)

component, the final coating having a coating surface roughness that is less than the component surface roughness.

12 Claims, 1 Drawing Sheet

(51) Int. Cl.
| | |
|---|---|
| B28B 7/00 | (2006.01) |
| B28B 7/06 | (2006.01) |
| B28B 7/34 | (2006.01) |
| B28B 19/00 | (2006.01) |
| B29C 33/40 | (2006.01) |
| B29C 37/00 | (2006.01) |
| C04B 41/00 | (2006.01) |
| C04B 41/45 | (2006.01) |
| C04B 41/87 | (2006.01) |
| F01D 5/14 | (2006.01) |
| F01D 5/28 | (2006.01) |

(52) U.S. Cl.
CPC ............... *B28B 7/348* (2013.01); *B28B 19/00* (2013.01); *B28B 23/0068* (2013.01); *B29C 33/405* (2013.01); *B29C 37/0028* (2013.01); *C04B 41/0009* (2013.01); *C04B 41/45* (2013.01); *C04B 41/4539* (2013.01); *C04B 41/4578* (2013.01); B29C 2037/0035 (2013.01); C04B 41/87 (2013.01); F01D 5/147 (2013.01); F01D 5/282 (2013.01); F01D 5/284 (2013.01); F01D 5/288 (2013.01); F05D 2230/211 (2013.01); F05D 2230/51 (2013.01); F05D 2230/90 (2013.01); F05D 2300/6033 (2013.01)

(58) Field of Classification Search
CPC ............... B28B 7/0008; B29C 45/1679; B29C 37/0028; B29C 2037/0035; C04B 41/87; C23C 26/00; F01D 5/288; F01D 5/284; F05D 2230/90; F05D 2300/6033; B22C 7/02; B22C 9/04; B22C 9/103
See application file for complete search history.

(56) References Cited

U.S. PATENT DOCUMENTS

| | | | | |
|---|---|---|---|---|
| 2003/0190275 A1* | 10/2003 | Miyazawa | ............ | H01J 61/302 |
| | | | | 65/17.2 |
| 2008/0006384 A1* | 1/2008 | Memmen | ................ | B22C 9/103 |
| | | | | 164/369 |
| 2008/0265459 A1* | 10/2008 | Gasworth | ............ | B29C 45/1679 |
| | | | | 264/255 |
| 2010/0289181 A1* | 11/2010 | Tsutsui | .................... | B28B 1/008 |
| | | | | 264/272.13 |
| 2013/0333855 A1* | 12/2013 | Merrill | ....................... | B22C 7/02 |
| | | | | 164/45 |
| 2016/0332922 A1* | 11/2016 | Tang | ...................... | C23C 28/044 |
| 2017/0073277 A1 | 3/2017 | Shim et al. | | |
| 2017/0159459 A1 | 6/2017 | Courcot | | |
| 2019/0322894 A1* | 10/2019 | McCanna | ............ | B29C 67/246 |

FOREIGN PATENT DOCUMENTS

| | | | | | |
|---|---|---|---|---|---|
| JP | H0872097 A | * | 3/1996 | ......... | B29C 37/0028 |
| JP | 2005161683 A | * | 6/2005 | ......... | B29C 37/0028 |
| JP | 2007176021 A | * | 7/2007 | ......... | B29C 44/0461 |
| WO | 2005046958 | | 5/2005 | | |
| WO | WO-2005046958 A1 | * | 5/2005 | ......... | B29C 37/0028 |

OTHER PUBLICATIONS

Machine English translation of Takeushi Masaki (WO2005046958A1) (Year: 2005).*
Machine English translation of BABA et al. (JP 2005161683 A) (Year: 2005).*
Machine English translation of Takeuchi (WO-2005046958-A1) (Year: 2005).*
European Search Report for European Patent Application No. 21191556.6 mailed Jan. 14, 2022.

* cited by examiner

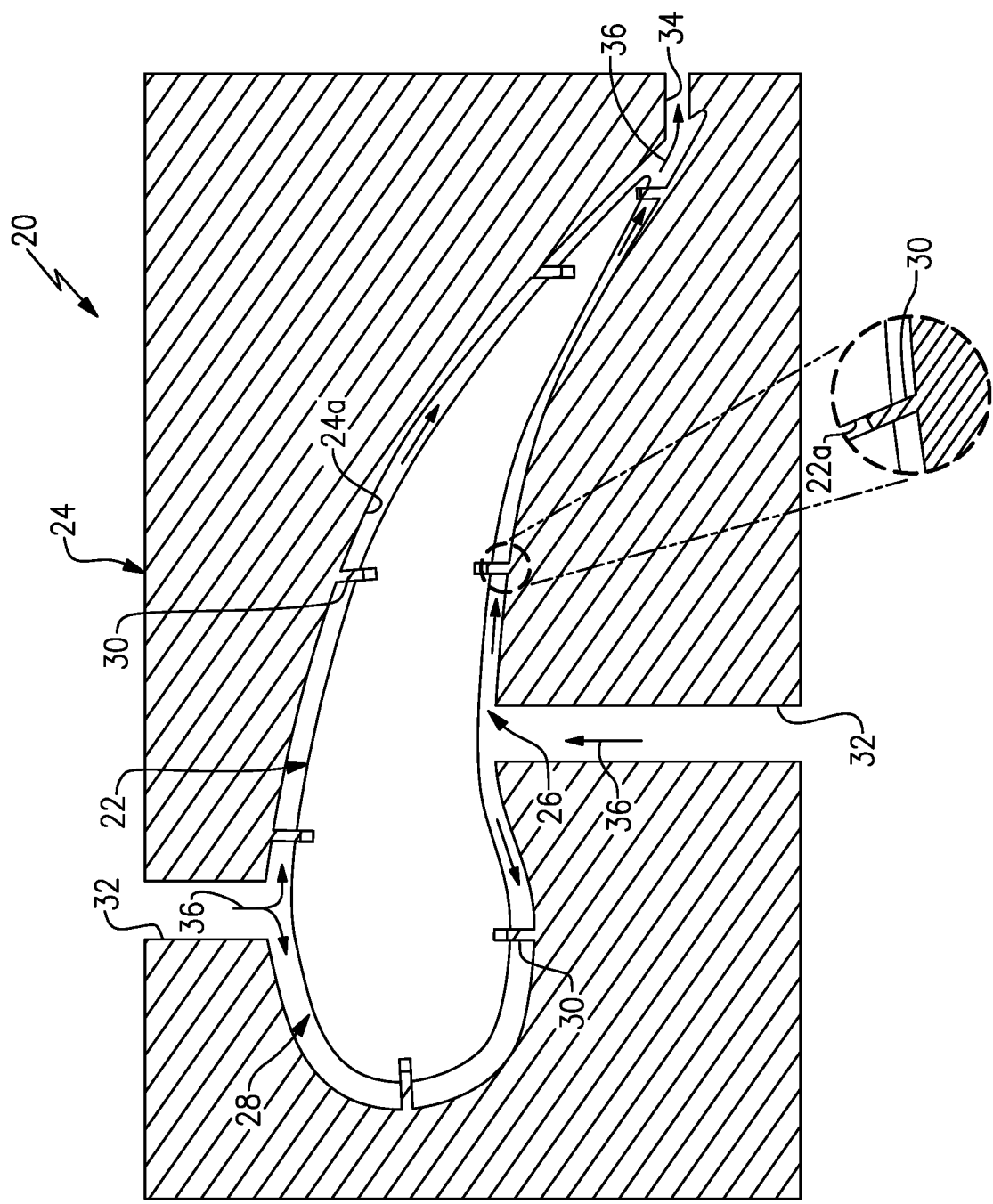

METHOD AND SYSTEM FOR MOLDED COATING ON CMC

CROSS-REFERENCE TO RELATED APPLICATION

The present disclosure claims priority to U.S. Provisional Application No. 63/065,665 filed Aug. 14, 2020.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils and other engine components that are subjected to severe operating environments are typically formed of a superalloy and may include barrier coatings to extend durability. Ceramic matrix composite ("CMC") materials are also being considered for airfoils and other engine components. Among other attractive properties, CMCs have high temperature resistance and oxidation resistance. Despite these attributes, however, there are unique challenges to implementing CMCs in airfoils.

SUMMARY

A method of forming a coating according to an example of the present disclosure includes providing a mold that has a flexible wall that defines a mold cavity, and inserting a component that is to be coated into the mold cavity. The component has a component surface roughness and there is a coating gap defined between the component and the flexible wall of the mold cavity. A molding slurry is introduced into the mold cavity, fills the coating gap, and contacts the component so as to overcoat the component surface roughness. The molding slurry solidifies to form a green coating on the component. The green coating is then consolidated to form a final coating on the component. The final coating has a coating surface roughness that is less than the component surface roughness.

In a further embodiment of any of the foregoing embodiments, the inserting includes situating the component in the mold cavity such that the coating gap is of uniform thickness.

In a further embodiment of any of the foregoing embodiments, the inserting includes using one or more bumpers in the mold cavity to space the component from the flexible wall.

In a further embodiment of any of the foregoing embodiments, the component has one or more cooling holes, and the one or more bumpers plug the one or more cooling holes.

In a further embodiment of any of the foregoing embodiments, the component has a cooling hole that is plugged.

In a further embodiment of any of the foregoing embodiments, the slurry includes silica.

In a further embodiment of any of the foregoing embodiments, the slurry includes siliconoxycarbide.

In a further embodiment of any of the foregoing embodiments, the solidifying includes heating the molding slurry while in the coating gap in the mold cavity.

In a further embodiment of any of the foregoing embodiments, the mold includes at least one injection port and at least one vent port.

In a further embodiment of any of the foregoing embodiments, the mold is formed of silicone.

A coating system according to an example of the present disclosure includes a mold having a flexible wall that defines a mold cavity. A component is disposed in the mold cavity, and there is a coating gap defined between the component and the flexible wall of the mold cavity. Either a molding slurry or a solidified molding slurry fills the coating gap.

In a further embodiment of any of the foregoing embodiments, the mold is formed of silicone.

In a further embodiment of any of the foregoing embodiments, the mold includes one or more bumpers spacing the component from the flexible wall.

In a further embodiment of any of the foregoing embodiments, the component includes one or more cooling holes, and the one or more bumpers plug the one or more cooling holes.

In a further embodiment of any of the foregoing embodiments, the component is a gas turbine engine component formed of ceramic.

In a further embodiment of any of the foregoing embodiments, the molding slurry and the solidified molding slurry contain silica.

In a further embodiment of any of the foregoing embodiments, the molding slurry and the solidified molding slurry contain siliconoxycarbide.

A coating system according to an example of the present disclosure includes a mold that has a flexible wall that defines a mold cavity that is configured in geometry to receive a component therein such that there is a coating gap defined between the component and the flexible wall of the mold cavity to receive a molding slurry.

In a further embodiment of any of the foregoing embodiments, the mold is formed of silicone.

In a further embodiment of any of the foregoing embodiments, the mold includes one or more bumpers projecting in the mold cavity.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates and system and method for molding a coating on a CMC component.

DETAILED DESCRIPTION

Gas turbine engine components may be formed of ceramic matrix composites ("CMC"). Generally speaking, a CMC includes ceramic (or sometimes graphite) fibers (typically referred to as yarns, composed of bundles of filaments) disposed in a ceramic matrix. One example CMC of interest in gas turbine engines includes SiC fibers in a SiC matrix. Due to the undulation between yarns, the methods of fabricating the CMC, or other factors, the surface of the CMC is typically relatively rough (e.g., in comparison to the same or similar component that is cast from superalloy). For instance, the roughness may be 1000 microinches $R_a$ or greater, which in turn may affect aerodynamic performance. To the extent that a coating is deposited over the as-formed surface of the CMC, such as by a spray process, the coating may serve to somewhat smooth over the roughness. However, in many cases the smoothing effect may be negligible, since the coating mostly conforms to the underlying rough surface of the CMC and thereby substantially reproduces the roughness or undulation in its own surface. In this regard, as will be described below, the system and method disclosed herein may be used to fabricate a coating in a manner that facilitates smoothing of a CMC surface.

FIG. 1 schematically illustrates a coating system 20, which is also used herein to represent a related method of molding a coating. The description herein is based on an airfoil (e.g., a vane or blade) as the subject component 22, although it is to be understood that this disclosure is applicable to other CMC components, such as but not limited to, blade outer air seals and combustor liners.

The system 20 includes a mold 24 that has a flexible wall 24a that defines a mold cavity 26 therein. Although shown with one mold cavity 26, the mold 24 may alternatively have two or more mold cavities for co-molding coatings onto several components at once. As an example, the flexible wall 24a is formed of flexible material, such as silicone, in order to impart flexibility and temperature resistance for processing. The silicone, or other elastomeric or resilient material, may be selected to be firm enough to be self-supporting, so as to substantially maintain its shape when at rest yet permit deflection within the applicable molding pressures.

The mold cavity 26 generally tracks the design shape of the component 22 but is larger than the component 22, as will be discussed further below. The mold 24 may be provided in two (or more) separable pieces, which may be referred to as mold halves or sections. If economic, the mold 24 may alternatively be of one-piece construction, for a single use in which it is destroyed for removal. The separable pieces of the mold 24 can be brought together into a closed state (shown in FIG. 1), with alignment guides if necessary, to define the mold cavity 26. From the closed state, the separable pieces of the mold 24 can be separated, i.e., opened, to permit insertion of the component 22 into the mold cavity 26 or removal of the component 22 from the mold cavity 26. Such opening and closing of the mold 24 can be performed in an automated machine or manually.

As shown in FIG. 1, the mold cavity 26 is somewhat larger than the component 22 such that there is a coating gap 28 defined between the component 22 and the flexible wall 24a of the mold cavity 26. Although not limited, in this example the mold 24 includes one or more bumpers 30 that serve as stand-offs to space the component 22 a set distance apart from the flexible walls 24a of the mold 24. Such bumpers 30 may be integral with the mold 24, such a silicone posts that protrude from the flexible wall 24a. The shape of the bumpers 30 is not necessarily limited, although it may be desirable to minimize the size to reduce interference with the molding process. As examples, the bumpers 30 may be cylindrical or pyramidal.

As shown in the inset in FIG. 1, the bumper 30 extends into a cooling hole 22a in the component 22. The bumper 30 has a relatively tight fit in the cooling hole 22a so as to plug and seal the cooling hole against infiltration of coating slurry (described below). For example, each bumper 30 may extend into a corresponding cooling hole 22a in the component 22. If fewer bumpers 30 than cooling holes 22a are used, the cooling holes 22a may be separately plugged, such as with wax or the like.

The component 22 is generally positioned such that the coating gap 28 is of uniform thickness, although it is also contemplated that the component 22 be offset in the mold cavity or that the height of the bumpers 30 may vary in order to provide regions of the coating gap 28 with different thicknesses. The thickness may generally be from about 100 micrometers to about 1000 micrometers.

The mold 24 further includes at least one injection port 32 and at least one vent port 34. The injection port or ports 32 are fluidly connected with the coating gap 28 and serve to receive molding slurry 36 that is introduced into the mold 24, such as by a syringe, plunger, screw, pump, funnel, or other equipment. The vent port or ports 34 are also fluidly connected with the coating gap 28 at a downstream location from the injection port or ports 32. The vent port or ports 34 serve to vent air from the mold 24 and receive overflow molding slurry to ensure that the coating gap 28 fills.

In the molding process, the component 22 is first inserted into the mold cavity 26. For example, the mold 24 is in the open position and the component 22 is seated into one of the mold halves on the respective bumpers 30. Such a placement can be performed by an automated machine or manually. Once the component 22 is properly seated, the other mold half of the mold 24 is closed around the component 22.

Next, the molding slurry 36 is introduced into the mold cavity 26. For example, the molding slurry 36 is injected through the injection port or ports 32, such as by syringe, plunger, screw, pump, funnel, or other equipment. The molding slurry 36 is fluid and flows into the mold cavity 26 and through the coating gap 28. The flexible walls 24a of the mold 24 may deflect somewhat under the pressure of the molding slurry 36, which allows for manufacturing tolerances in the geometry of the component 22. The molding slurry 36 fills the coating gap 28, contacting the component 22 so as to overcoat the component surface roughness. Any excess molding slurry 36 vents through the vent port 34. Additionally, the relatively small thickness of the coating gap 28 serves to contain the molding slurry 36 and thereby limit mobility of the powder particles and thus facilitate avoidance of particle settling. Optionally, the mold 24 may be vibrated and/or rotated during or after filling and/or drying to facilitate displacement of the air the mold cavity 26 and help prevent particulate settling in the slurry prior to drying.

The composition of the molding slurry 36 may be varied in accordance with the desired composition of the final coating and to optimize flow properties through the mold 24. For example, the molding slurry 36 contains a carrier liquid, such as water or organic solvent, and coating powder particles. In one example based on a SiC/SiC CMC, the coating powder particles include silica, siliconoxycarbide, or both, which ultimately form a final coating that serves as a bond coat that will underlie one or more additional topcoats on the component 22.

After the coating gap 28 is filled, the molding slurry 36 is solidified. For a water- or solvent-based slurry, the solidifying includes drying in order to remove the water or solvent, leaving the coating powder particles as a green coating on the surface of the component 22. Such drying may include heating the molding slurry 36 while in the coating gap 28 in the mold cavity 26, such as by heating the coating system 20 in a thermal chamber or the like. In one further example, the composition of the molding slurry 36 also includes a binder that strengthens the green coating. Such a binder may be an organic binder, such as but not limited to, wax or cross-linkable polymer. The molding of the mold slurry 36 can be repeated in the same or different mold 24 if needed in order to build up a desired coating thickness. Additionally, if bumpers 30 are used and the bumpers 30 leave holes in the green coating (that do not correspond to cooling holes in the component 22), the holes may be filled with patch material comprising the same coating powder.

After solidification, the green coating is consolidated to form a final coating on the component 22. For example, the component 22 is removed from the mold 24 and heated to a temperature at which the coating powder sinters or fuses. The final coating has a coating surface roughness that is less than the component surface roughness. For example, the final coating has a surface roughness of less than 200 Ra. This is due to the molding slurry 36 smoothing over the component surface roughness. Reproduction of the roughness of the component 22 in the surface of the coating may be reduced because the surface of the coating is formed against the relatively smooth surface of the mold wall 24a in the molding process. For coating powder particles that include silica and siliconoxycarbide, the final coating includes a silica matrix with the siliconoxycarbide dispersed there through. After consolidation, the component 22 may be subjected to one or more additional coating processes to deposit one or more topcoats, such as but not limited to, one or more additional silica and/or siliconoxycarbide layers, and/or one or more ceramic layers (e.g., a Hf-, Y-, and/or Yb-containing layers).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of forming a coating, comprising:
    providing a mold that has a flexible wall formed of silicone elastomer that defines a mold cavity;
    inserting a component that is to be coated into the mold cavity, the component having a component surface roughness and there being a coating gap defined between the component and the flexible wall of the mold cavity;
    introducing a molding slurry into the mold cavity, the molding slurry including a carrier liquid and powder particles, the molding slurry filling the coating gap and contacting the component so as to overcoat the component surface roughness;
    solidifying the molding slurry to form a green coating of powder particles on the component; and
    consolidating the green coating to form a final coating on the component, the final coating having a coating surface roughness that is less than the component surface roughness.

2. The method as recited in claim 1, wherein the inserting includes situating the component in the mold cavity such that the coating gap is of uniform thickness.

3. The method as recited in claim 1, wherein the inserting includes using one or more bumpers in the mold cavity to space the component from the flexible wall.

4. The method as recited in claim 3, wherein the component has one or more cooling holes, and the one or more bumpers plug the one or more cooling holes.

5. The method as recited in claim 1, wherein the component has a cooling hole that is plugged.

6. The method as recited in claim 1, wherein the solidifying includes heating the molding slurry while in the coating gap in the mold cavity.

7. The method as recited in claim 1, wherein the mold includes at least one injection port and at least one vent port.

8. The method as recited in claim 1, wherein the consolidating includes heating the green coating to a temperature at which the powder particles sinter.

9. The method as recited in claim 1, wherein the mold is formed of elastomer.

10. The method as recited in claim 1, wherein the component is a gas turbine engine component formed of ceramic matrix composite.

11. The method as recited in claim 8, wherein the component is a ceramic matrix composite.

12. The method as recited in claim 11, wherein the powder particles include at least one of silica particles or siliconoxycarbide particles.

* * * * *